(12) United States Patent
Ricke (10) Patent No.: US 11,815,114 B2
(45) Date of Patent: *Nov. 14, 2023

(54) INTEGRAL INSTALLATION AID

(71) Applicant: Hoffman Enclosures Inc., Anoka, MN (US)

(72) Inventor: Joseph Ricke, Arden Hills, MN (US)

(73) Assignee: Hoffman Enclosures Inc., Anoka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/883,849

(22) Filed: Aug. 9, 2022

(65) Prior Publication Data

US 2022/0378204 A1    Dec. 1, 2022

Related U.S. Application Data

(63) Continuation of application No. 16/944,959, filed on Jul. 31, 2020, now Pat. No. 11,408,456.

(60) Provisional application No. 62/882,334, filed on Aug. 2, 2019.

(51) Int. Cl.
| | |
|---|---|
| *F16B 12/10* | (2006.01) |
| *A47B 96/14* | (2006.01) |
| *A47B 55/00* | (2006.01) |
| *F16B 12/04* | (2006.01) |
| *F16B 12/14* | (2006.01) |

(52) U.S. Cl.
CPC .............. *F16B 12/10* (2013.01); *A47B 55/00* (2013.01); *A47B 96/14* (2013.01); *F16B 12/14* (2013.01); *F16B 2012/106* (2013.01)

(58) Field of Classification Search
CPC .... F16B 12/14; F16B 2012/106; A47B 55/00; A47B 96/14
See application file for complete search history.

(56) References Cited

U.S. PATENT DOCUMENTS

| | | |
|---|---|---|
| 2,756,369 A | 7/1956 | Gorrie |
| 3,178,246 A | 4/1965 | Michael |
| 4,249,830 A | 2/1981 | Day |
| 5,076,649 A | 12/1991 | Therkelsen |
| 5,090,137 A | 2/1992 | Zagar |

(Continued)

FOREIGN PATENT DOCUMENTS

| | | |
|---|---|---|
| CN | 206869839 U | 1/2018 |
| CN | 207802574 U | 8/2018 |

(Continued)

*Primary Examiner* — Daniel J Rohrhoff
(74) *Attorney, Agent, or Firm* — QUARLES & BRADY LLP (57) ABSTRACT

An enclosure can have an enclosure body, the enclosure body can include an enclosure frame, and a first enclosure flange. The enclosure can have a center post having a first end and an opposite second end, the first end can include a first center post flange having a hole extending therethrough. The enclosure can include a gasket having a gasket hole therethrough, and a threaded fastener to threadingly engage the hole. The threaded fastener can be configured to rotate in a first direction while threadingly engaged with the hole, and the threaded fastener can contact the first enclosure flange to increase a distance between the first enclosure flange and the first center post flange in order to receive the gasket.

20 Claims, 7 Drawing Sheets

(56) References Cited

U.S. PATENT DOCUMENTS

| | | | |
|---|---|---|---|
| 5,372,262 A | 12/1994 | Benson et al. | |
| 6,384,323 B2 | 5/2002 | Elm et al. | |
| 6,502,702 B1 | 1/2003 | Hsue et al. | |
| 6,945,616 B2 * | 9/2005 | Webster | H02B 1/50 |
| | | | 312/265.3 |
| 7,293,666 B2 | 11/2007 | Mattlin et al. | |
| 8,616,661 B2 | 12/2013 | Takata et al. | |
| 8,967,401 B2 | 3/2015 | Wu | |
| 9,185,824 B2 | 11/2015 | Nordin et al. | |
| 9,291,356 B2 * | 3/2016 | Demster | F24F 1/022 |
| 9,859,698 B2 | 1/2018 | Scanzillo et al. | |
| 9,887,527 B2 | 2/2018 | Scanzillo et al. | |
| 9,946,044 B1 * | 4/2018 | Gralewski-Sek | H04Q 1/026 |
| 10,076,049 B2 | 9/2018 | Nordin et al. | |
| 10,084,297 B2 | 9/2018 | Scanzillo et al. | |
| 10,356,925 B2 | 7/2019 | Nordin et al. | |
| 10,537,038 B2 * | 1/2020 | Reese | H02B 1/38 |
| 11,408,456 B2 * | 8/2022 | Ricke | A47B 47/021 |
| 2004/0183409 A1 | 9/2004 | Rinderer | |
| 2011/0304244 A1 | 12/2011 | Cottuli et al. | |
| 2012/0007478 A1 | 1/2012 | Fan | |
| 2014/0054082 A1 * | 2/2014 | Gilliland | H05K 9/0015 |
| | | | 174/351 |
| 2014/0076601 A1 | 3/2014 | Takata et al. | |
| 2014/0159554 A1 | 6/2014 | Liu et al. | |
| 2017/0150636 A1 | 5/2017 | Segroves et al. | |
| 2017/0223864 A1 | 8/2017 | Jost et al. | |
| 2018/0030736 A1 * | 2/2018 | Chen | E06B 9/04 |
| 2018/0135350 A1 | 5/2018 | Reese et al. | |
| 2019/0027911 A1 | 1/2019 | Scanzillo et al. | |
| 2021/0018028 A1 * | 1/2021 | Hutson | F16B 12/10 |
| 2022/0104619 A1 * | 4/2022 | Dyer | H02B 1/303 |

FOREIGN PATENT DOCUMENTS

| | | |
|---|---|---|
| GB | 2524025 B | 9/2015 |
| JP | 2013240198 A | 11/2013 |
| WO | 2016/168800 A1 | 10/2016 |

* cited by examiner

INTEGRAL INSTALLATION AID

CROSS-REFERENCE TO RELATED APPLICATIONS

This application is a continuation application of U.S. patent application Ser. No. 16/944,959 filed Jul. 31, 2020 and entitled "Integral Installation Aid," which claims priority to U.S. Patent Application No. 62/882,334 filed Aug. 2, 2019, and entitled, "Integral Installation Aid," each of which is hereby incorporated by reference in its entirety.

STATEMENT REGARDING FEDERALLY SPONSORED RESEARCH

Not applicable.

BACKGROUND

Enclosures are used in various industries to conceal and retain different types of supplies, which can include, for example, electrical components. Typically, enclosures include a metal frame that supports metal paneling, which defines the internal volume of the enclosure. The metal frame can include a center post that bisects an opening of the enclosure, such that two smaller doors can be installed about the center post. The metal frame can also include gaskets to ensure that the enclosure remains water-tight. Usually, enclosures arrive to the customer with the center post installed in the enclosure.

SUMMARY

Some embodiments of the disclosure provide an enclosure. The enclosure can include a first enclosure flange, and a center post having a first end and an opposite second end. The first end can include a first center post flange. The first center post flange can have a hole extending therethrough. The enclosure can include a gasket having a gasket hole therethrough, and a first threaded fastener to threadingly engage the hole. The first threaded fastener can be configured to rotate in a first direction while threadingly engaged with the hole to contact the first enclosure flange and increase a distance between the first enclosure flange and the first center post flange to provide clearance to receive the gasket between the first enclosure flange and the first center post flange.

In some embodiments, the gasket hole can be a cutout that can be centrally located. In some embodiments, when the gasket is received between the first enclosure flange and the first center post flange, the threaded fastener can be received in the cutout.

In some embodiments, the cutout defines a slot that is directed into a front edge of the gasket and extends until the slot ends at a concave portion of the slot.

In some embodiments, the enclosure can include a first fastening assembly configured to fasten the first center post flange to the first enclosure flange, and a second fastening assembly configured to fasten the first center post flange to the first enclosure flange.

In some embodiments, the hole is a first hole, and the first fastening assembly can include a second hole directed through the first center post flange, a third hole directed through the first enclosure flange, the third hole can be threaded, and a second fastener configured to be inserted through the second hole and threadingly engaged with the third hole to fasten the first center post flange and the first enclosure flange together. The second fastening assembly can include a fourth hole directed through the first center post flange, a fifth hole directed through the first enclosure flange, the fifth hole can be threaded, and a third fastener configured to be inserted through the fourth hole and threadingly engaged with the fifth hole to fasten the first center post flange and the first enclosure flange together.

In some embodiments, the first hole is located between the second hole and the fourth hole.

In some embodiments, the enclosure can include a third fastening assembly configured to fasten the first center post flange to the first enclosure flange, and a fourth fastening assembly configured to fasten the first center post flange to the first enclosure flange.

In some embodiments, the third fastening assembly can include a sixth hole directed through the first center post flange, and a seventh hole directed through the first enclosure flange, the seventh hole can be threaded, and a third fastener configured to be inserted through the sixth hole and threadingly engaged with the seventh hole to fasten the first center post flange and the first enclosure flange together. The fourth fastening assembly can include an eighth hole directed through the first center post flange, a ninth hole directed through the first enclosure flange, the ninth hole being threaded, and a fourth fastener configured to be inserted through the eighth hole and threadingly engaged with the ninth hole to fasten the first center post flange and the first enclosure flange together.

In some embodiments, the cutout is a first cutout, and the gasket can further include a second cutout, and a third cutout. The first cutout can be located between the second cutout and the third cutout.

In some embodiments, the first cutout is a first slot that is directed into a front edge of the gasket and extends until the first slot ends at a first concave portion of the first slot. The second cutout is a second slot that is directed into the front edge of the gasket and extends until the second slot ends at a second concave portion of the second slot. The third cutout defines a third slot that is directed into the front edge of the gasket and extends until the third slot ends at a third concave portion of the slot.

In some embodiments, when the gasket is received between the first enclosure flange and the first center post flange the second fastener can be received in the second cutout, and the third fastener can be received in the third cutout.

In some embodiments, the gasket can further include a second gasket hole directed through the gasket, and a third gasket hole directed through the gasket. The second and the third gasket holes can be located on opposing sides of the gasket.

In some embodiments, the first, second, and third cutouts are located between the second gasket hole and the third gasket hole.

In some embodiments, the gasket is a first gasket. The first enclosure flange is a lower enclosure flange. The first center post flange is lower center post flange. The center post can include an upper enclosure flange opposite the lower enclosure flange. The enclosure can include an upper enclosure flange opposite the lower enclosure flange, the upper enclosure flange including a second hole extending therethrough, and a second gasket having a second gasket hole therethrough. The enclosure can include a second threaded fastener to threadingly engage the second hole, the second threaded fastener being configured to rotate in the second direction while threadingly engaged with the second hole to contact the upper enclosure flange and increase a distance between the upper enclosure flange and the upper center post flange to provide clearance to receive the second gasket between the upper enclosure flange and the upper center post flange.

In some embodiments, a first end surface of the first threaded fastener contacts a first surface of the lower enclosure flange that does not include a threaded hole. In some embodiments, a second end surface of the second threaded fastener contacts a second surface of the upper enclosure flange that does not include a threaded hole.

Some embodiments of the disclosure provide a center post arrangement for an enclosure with a first enclosure flange. The center post arrangement can include a center post. The center post can include a first center post flange, a second center post flange, and a body having a first end and an opposite second end. The first end can be coupled to the first center post flange, and the second end can be coupled to the second center post flange. The center post arrangement can include a plurality of holes directed through the first center post flange. The plurality of holes can include a first hole configured to engage with a first fastener to secure the first flange to the first enclosure flange, a second hole configured to engage with a second fastener to secure the first flange to the first enclosure flange, a third hole configured to engage with a third fastener to secure the first flange to the first enclosure flange, a fourth hole configured to engage with a fourth fastener to secure the first flange to the first enclosure flange, and a fifth hole situated between the first and second holes, the fifth hole configured to threadingly engage a fifth fastener. The fifth fastener can be configured to be advanced to contact a surface of the first enclosure flange to separate the first center post flange from the first enclosure flange.

In some embodiments, the center post arrangement can include a gasket. The gasket can include a first hole, a second hole, and a first cutout situated between the first hole and the second hole. The gasket can be dimensioned to be received between the first flange and the first enclosure flange, when the threaded fastener is advanced to separate the first flange from the first enclosure flange. In some embodiments, when the gasket is received between the first enclosure flange and the first center post flange, the threaded fastener is received in the first cutout.

In some embodiments, the fourth fastener is configured to be received within the first hole of the gasket, and the fifth fastener is configured to be received within the second hole of the gasket.

In some embodiments, the first hole is a second cutout, and the second hole is a third cutout. The first cutout can be situated between the second cutout and the third cutout.

Some embodiments of the disclosure provide a gasket for a center post of an enclosure. The gasket can include a first surface and an opposite second surface, a front edge and a rear edge opposite the front edge, a first cutout extending into the front edge of the gasket, and a second cutout extending into the rear edge of the gasket. The second cut out can have a rectangular shape. The first cutout can be configured to receive a threaded fastener that is threadingly engaged with the center post.

Some embodiments of the disclosure provide a method for configuring a center post of an enclosure. The method can include aligning a first flange of the center post with a second flange of the enclosure, threadingly engaging a threaded fastener with a first threaded hole of the first flange of the center post, rotating the threaded fastener to advance the threaded fastener to contact a surface of the first flange to separate the first flange of the center post from the second flange of the enclosure, and inserting a gasket between the first flange of the center post and the second flange of the enclosure.

In some embodiments, the method can include fastening the first flange of the center post to the second flange of the enclosure.

In some embodiments, fastening the first flange of the center post to the second flange of the enclosure can include aligning a second hole of the first flange of the center post flange with a third hole of the second flange of the enclosure, aligning a fourth hole of the first flange of the center post flange with a fifth hole of the second flange of the enclosure, inserting a first fastener through the second hole and threadingly engaging the first fastener with the third hole, and inserting a second fastener through the fourth hole and threadingly engaging the second fastener with the fifth hole.

In some embodiments, the second hole and the fourth hole are located on opposing sides of the first threaded hole.

In some embodiments, fastening the first flange of the center post to the second flange of the enclosure can include aligning a sixth hole of the first flange of the center post flange with a seventh hole of the second flange of the enclosure, aligning an eighth hole of the first flange of the center post flange with a ninth hole of the second flange of the enclosure, inserting a third fastener through the sixth hole and threadingly engaging the third fastener with the seventh hole, and inserting a fourth fastener through the eighth hole and threadingly engaging the fourth fastener with the ninth hole.

In some embodiments, the method can include partially fastening the first flange of the center post to the second flange of the enclosure, prior to fastening the first flange of the center post to the second flange of the enclosure.

In some embodiments, the method can include inserting the threaded fastener into a cutout of the gasket, and contacting the gasket with the threaded fastener.

In some embodiments, the method can include removing another gasket that is situated between the first flange of the center post and the second flange of the enclosure. In some embodiments, the method can include reorienting the gasket between the first flange of the center post and the second flange of the enclosure.

In some embodiments, the method can include removing a first fastener that fastens the first flange of the center post with the second flange of the enclosure, removing a second fastener that fastens the first flange of the center post with the second flange of the enclosure, loosening a third fastener that fastens the first flange of the center post with the second flange of the enclosure, and loosening a fourth fastener that fastens the first flange of the center post with the second flange of the enclosure.

In some embodiments, loosening of the third and fourth fasteners occurs prior to the threaded fastener contacting the surface of the second flange of the enclosure.

In some embodiments, the third fastener and the fourth fastener are positioned between the first threaded hole.

In some embodiments, the third fastener and the fourth fastener are positioned between the first fastener and the second fastener.

Some embodiments of the disclosure provide a gasket for a center post of an enclosure. The gasket can include a first surface and an opposite second surface, a front edge and a rear edge opposite the front edge, a first cutout extending into the front edge of the gasket, and a second cutout extending into the rear edge of the gasket. The second cut out can have a rectangular shape. The first cutout can be configured to receive a threaded fastener that is threadingly engaged with the center post.

In some embodiments, the gasket defines a first axis that bisects a horizontal dimension of the gasket. The first cutout can intersect the first axis.

In some embodiments, the gasket can include a second u-shaped cutout, and a third u-shaped cutout. The first cutout can be positioned between the second and third cutouts.

In some embodiments, the first, second, and third cutouts have a u-shape.

In some embodiments, the gasket can include a first hole and a second hole disposed on opposing sides of the gasket. The first, second, and third cutouts can be positioned between the first hole and the second hole.

Some embodiments of the disclosure provide a method for removing gasket of a center post of an enclosure, The method can include rotating a first fastener in a first direction, the first fastener fastening together a first end of the center post and a first enclosure flange, rotating a second fastener in a first direction, the second fastener fastening together a second end of the center post and a second enclosure flange, lifting the center post upwardly after rotating the first fastener and the second fastener by rotating a threaded fastener in a second direction to threadingly engage a tapped hole within the first end of the center post, and removing a gasket between the first end of the center post and the first enclosure flange.

In some embodiments, the method can include contacting an end of the threaded fastener with a surface of the first enclosure flange, separating the first end of the center post from the first enclosure flange by the rotation of the threaded fastener in the second direction.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "front," or "back" features is generally intended as a description only of the orientation of such features relative to a reference frame of a particular example or illustration. Correspondingly, for example, a "top" feature may sometimes be disposed below a "bottom" feature (and so on), in some arrangements or embodiments. Further, references to particular rotational or other movements (e.g., counterclockwise rotation) is generally intended as a description only of movement relative a reference frame of a particular example of illustration.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Typically, many, but not all of the components of an enclosure arrive pre-assembled to the customer. Components of the pre-assembled enclosure generally include the body of the enclosure (e.g., the metal frame and the affixed paneling) and an assembled center post. The assembled center post generally includes top and bottom flanges, each of which is fastened to a respective flange of the body of the enclosure. In order to provide a water-tight seal, a gasket is positioned between the top flange of the center post and the corresponding top flange of the enclosure body, as well as a gasket between the lower flange of the center post and the corresponding lower flange of the enclosure body. The flanges are fastened together (e.g., with fasteners), with the gasket sandwiched therebetween to compress the gasket and thus provide sufficient sealing.

In many cases, full assembly of the enclosure requires removal (or reconfiguring) of the previously assembled center post. For example, a component that is frequently omitted from the pre-assembled enclosure is the back panel of the enclosure. However, due to the dimensions of the back panel, the back panel sometimes cannot be manipulated to fit within either of the two openings created by the center post (e.g., the doorways of the enclosure, when doors are to be installed on the center post). Thus, the center post often must be removed to install the back panel. Unfortunately, removing the center post can be difficult, especially if the partially assembled enclosure has moved during transportation. For example, in some cases, if the gasket shifts during transportation, a portion of the gasket can lodge into one or more of the fastening holes, which can make unscrewing the fasteners difficult. Even if the fasteners are unscrewed, at times, the gasket can stick to respective flanges, almost acting as an adhesive securing the center post to the enclosure body.

In other cases, the enclosure shape can change slightly during transportation, making the gaps or tolerance between flanges smaller. For example, depending on where the enclosure is placed during transportation, such as, if the enclosure is placed on an uneven surface, the shape of the center post or the enclosure can change shape. As a more specific example, the enclosure opening (e.g., where the doors are placed) can change shape, or in some cases the center post can be pinched. If the center post has been successfully removed, and the back panel has been installed, it can be difficult to reinstall the center post to the enclosure body and ensure that the gaskets have been placed properly.

In some cases, during transportation of a fully assembled enclosure, a gasket within the installed center post can shift or deflect from its installation position. Although one could leave the shifted gasket on the fully assembled enclosure, without proper alignment or positioning of the gasket openings into the enclosure may form (e.g., at the gasket and flange interface), which could introduce leaks into the enclosure. Thus, if the gasket has shifted, it may be desirable to remove the center post, reposition the gasket, and reinstall the center post. However, as described above, for conventional arrangements, it is difficult to not only remove the center post, but also to reinstall the center post, while ensuring that the gaskets are placed properly. Thus, among other needs, it may be desirable to provide a system that allows for the easy removal and installation of the center post, including the easy positioning and removal of the gaskets.

Some embodiments of the disclosure provide advantages over previous configurations, and others, by providing a center post arrangement that can be easily separated from an enclosure for subsequent placement of a gasket. In particular, the enclosure can have an enclosure flange, and the center post can include a center post flange having a threaded hole directed therethrough. With the flanges aligned, a threaded fastener (e.g., a jack fastener, jack fastener, etc.) can be threadingly engaged with the threaded hole of the center post flange, rotated, and advanced to separate the flanges. Because the threaded fastener supports and actively separates the flanges (in some cases) the installer can easily install or position a gasket between the flanges. Once the gasket is positioned, the threaded fastener can be rotated to close the separation, and, as desired, the threaded fastener the fastener can be subsequently removed. The flanges can then be fastened, such as with fastening assemblies, with the gasket correctly located between the flanges.

In some embodiments, the number of threaded holes that correspond with the threaded fastener (e.g., the jack fastener), and the location of the threaded hole relative to the fastening assemblies can be advantageous. For example, the ability of having only a single threaded hole (corresponding to a jack fastener) to sufficiently separate the flanges can reduce the installment time that would otherwise be needed for installing other fasteners. Additionally, the single location of the threaded hole can be advantageous. As shown below, for example, a threaded hole can be situated on an axial axis that extends along the length of the center post (e.g., the length between the center post flanges) and that bisects the length of the flange. This generally central location of the threaded hole can mitigate unwanted rotational movement (e.g., pivoting) of the center post, when the jack fastener separates the flanges. For example, when the threaded hole is situated between two adjacent fasteners (e.g., fasteners 164, 166) undesirable pivoting of the center post can be mitigated (or prevented) at least because the two adjacent fasteners, when installed, can provide separate (and substantially equal) contact forces on opposing sides of the flange, which can thus prevent rotation of the flange.

Figure 1:
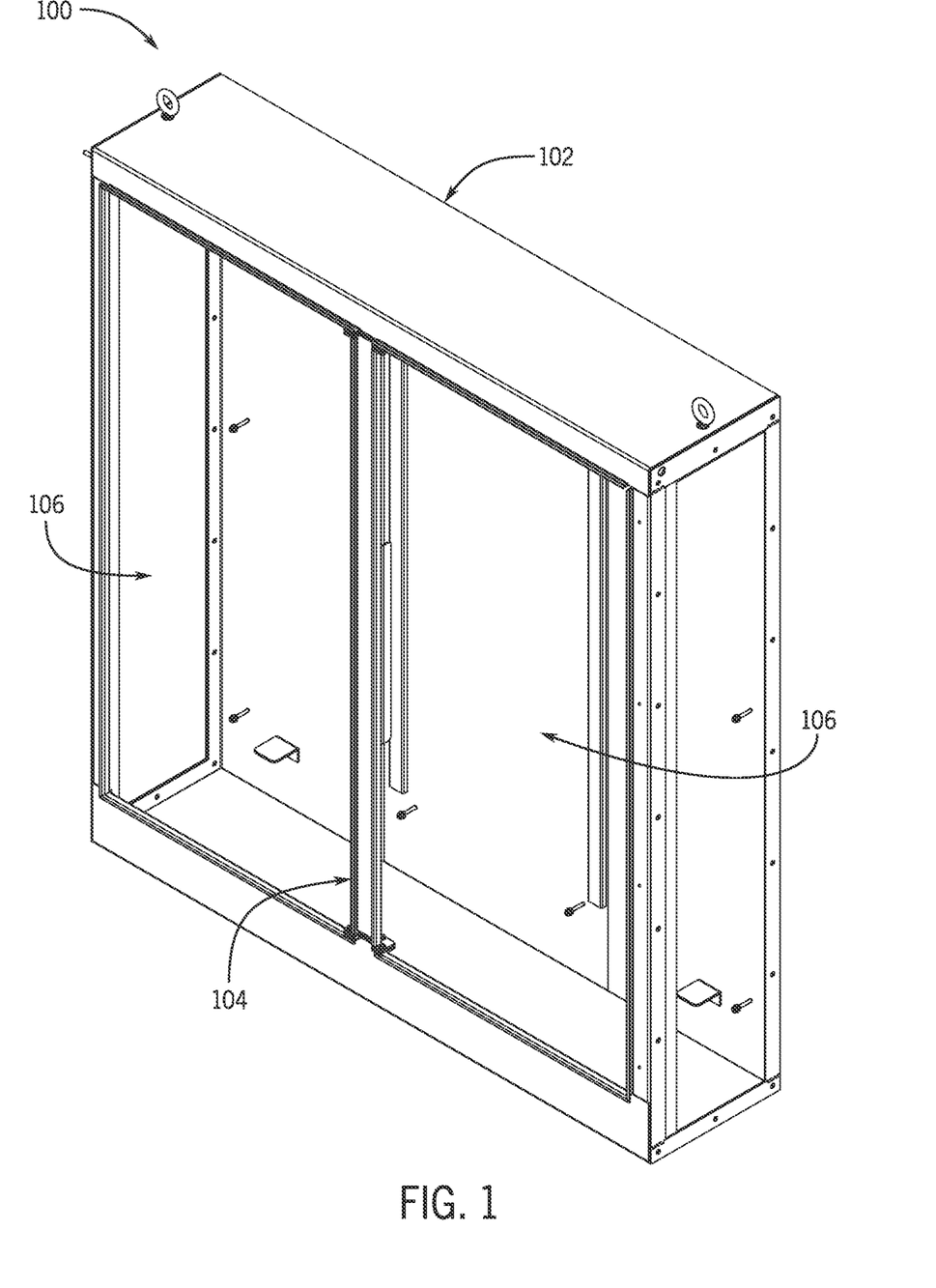
FIG. 1 is a front isometric view of an enclosure.

FIG. 1 illustrates an enclosure 100 according to one embodiment of the invention. The enclosure 100 includes an enclosure body 102, and a center post 104 installed in an opening 106 of the enclosure. The enclosure body 102 can be typically structured, and can include, for example, an enclosure frame having paneling secured to regions of the enclosure frame. The enclosure body 102 is rectangular shaped and is formed from metallic components (e.g., steel, aluminum, etc.).

Figure 2A:
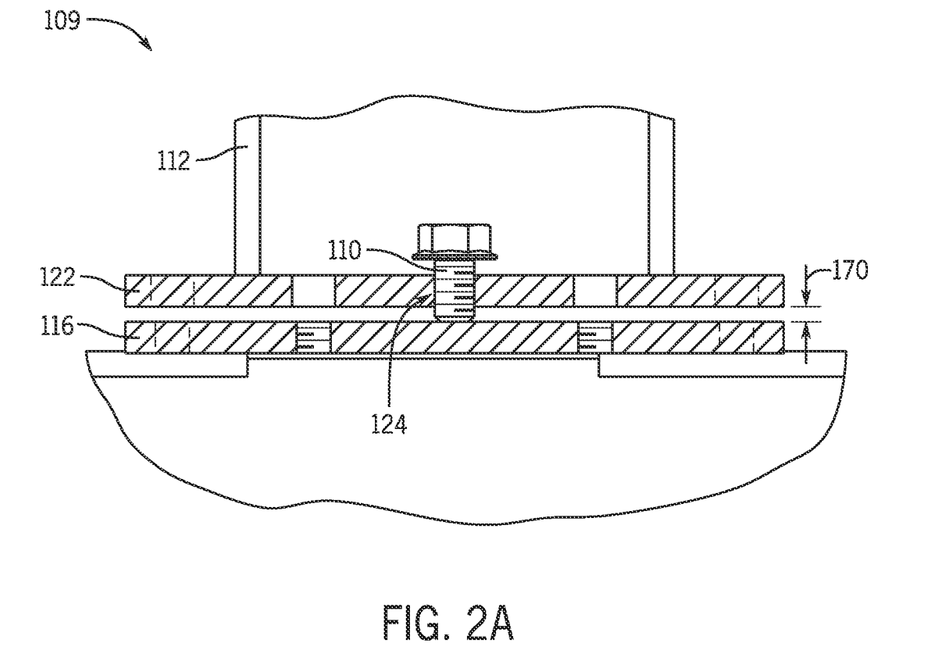
FIG. 2A is a cross-sectional view of an installation system for use with a center post.
Figure 3:
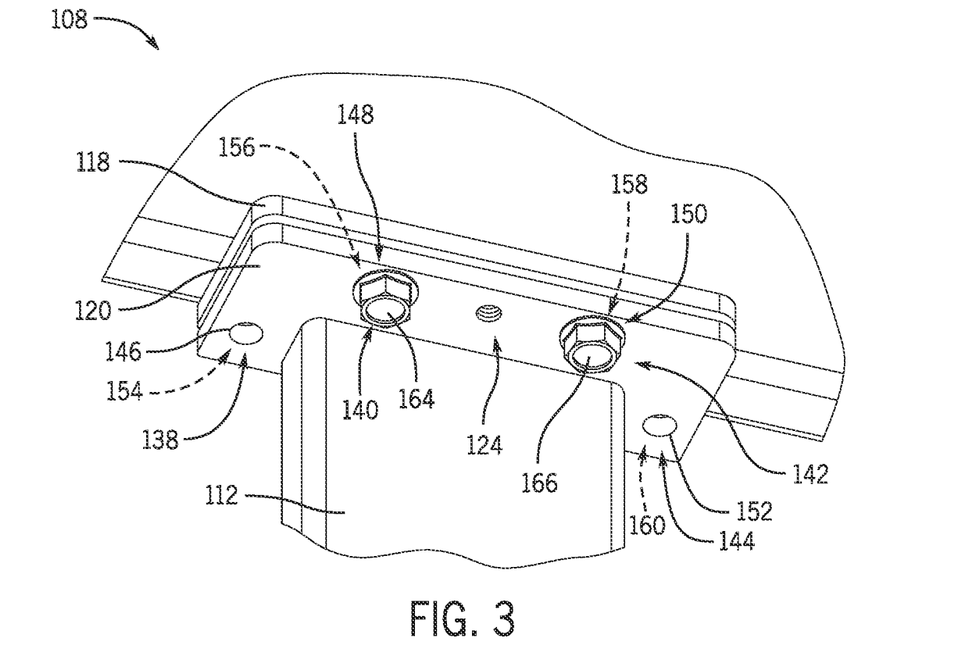
FIG. 3 is a bottom isometric view of an upper installation system for use with an upper center post flange and an upper enclosure flange.

FIG. 2A is a side view cross-section of a lower installation system 109, according to one embodiment of the invention. The lower installation system 109 includes a threaded fastener 110 and a modified center post 112. The threaded fastener 110 has an end surface, that when installed, is configured to contact a surface of a lower enclosure flange 116 of the enclosure body 102 (e.g., opposite to the upper enclosure flange 118 of the enclosure body 102). The modified center post 112 may begin as a typical center post (e.g., the center post 104), and thus the modified center post 112 also includes a upper center post flange 120 (as shown in FIG. 3) and a lower center post flange 122 (as shown in FIG. 2). As illustrated, the lower center post flange 122 of the modified center post 112 includes a tapped hole 124 that is centrally located and that extends through the lower enclosure flange 116. The tapped hole 124 has (internal) threads that correspond to the (external) threads of the threaded fastener 110.

Figure 2B:
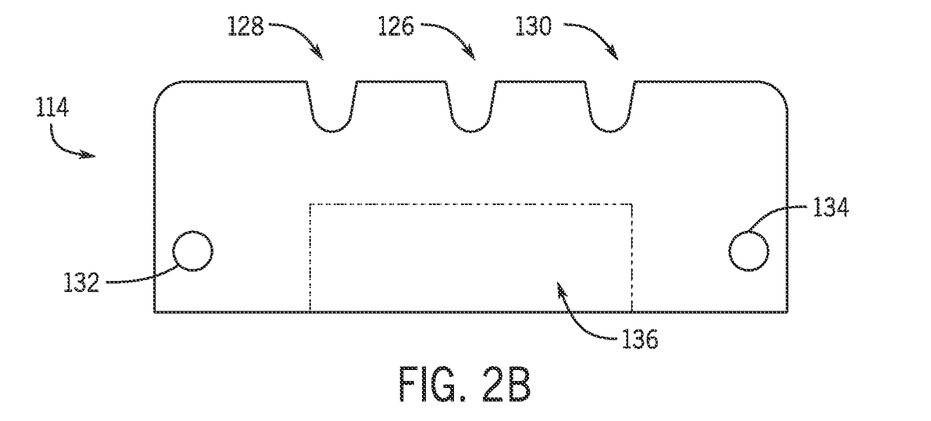
FIG. 2B is a top view of a gasket.

In some embodiments, and as shown in FIG. 2B, the gasket 114 has a generally rectangular profile that coincides with the shape of the lower flanges 116, 122. The gasket 114 can include a number of holes or cutouts, such that when the gasket 114 is installed between the lower flanges 116, 122, respective fasteners are received through the holes or cutouts of the gasket 114. In the illustrated embodiment, the gasket 114 has a centrally located u-shaped cutout 126 that extends through the entire thickness of the gasket 114 and opens to one side of the gasket 114. Similarly, on opposing lateral sides of the u-shaped cutout 126, are u-shaped cutouts 128, 130. The gasket 114 also includes circular holes 132, 134 that are located on opposing ends of the gasket 114. The circular holes 132, 134 extend through the entire thickness of the gasket 114. In some embodiments, the gasket 114 can include a rectangular cutout 136, which can help the installer to orient the gasket 114 correctly for installation. In some embodiments, the gasket 114 has a specific thickness, for example, a thickness of 1/16 of an inch. In other cases, the gasket 114 can have another thickness, depending on the environment the enclosure is designed to be used in.

Although in the illustrated embodiment the gasket 114 is shown as having three generally centrally located u-shaped cutouts 126, 128, 130, and two circular holes 132, 134, in other configurations, the gasket 114 can be created such that the circular holes can be replaced with u-shaped cutouts and vice versa. As a specific example, in alternative embodiments, the u-shaped cutouts 128, 130 can be circular holes, and the circular holes 132, 134 can be u-shaped cutouts, or other combinations of the two. In this specific example, the installation process would be slightly modified which would change the order in which the fastening assembes are installed. In some configurations, the holes 132, 134 could be (or include) cutouts that extend from the same location and end at the front edge of the gasket that includes the other cutouts (e.g., cutouts 128, 126, 130). Thus, in some configurations, such as those where the holes 132, 134 are cutouts, all the cutouts would be directed into the front edge of the gasket 114 to end at their respective locations. As such, when the holes 132, 134 are cutouts, these cutouts would span a longer distance than the cutouts 126, 128, 130.

In some embodiments, the gasket 114 can define a first axis (not shown) that extends into and away from the interior of the enclosure (when installed), and a second axis (not shown) perpendicular to the first axis, where both the first and second axes extend along a plane of the gasket. The first axis can bisect the horizontal dimension of the gasket 114, along the second axis. Thus, the cutout 126 can be located to intersect the first axis of the gasket 114.

Referring back to FIG. 2A, the threaded fastener 110 is threadingly engaged with the tapped hole 124. Accordingly, when rotated appropriately, the threaded fastener 110 can act like a jack, contacting the surface of the lower center post flange 122 to separate the lower enclosure flange 116 from the lower center post flange 122 by a distance 170. The distance 170 (e.g., from the surface of the lower enclosure flange 116 and the surface of the lower center post flange 122) can be increased by rotation of the threaded fastener 110 in a first direction, advancing the threaded fastener 110 through the tapped hole 124 and thereby urging the end of the fastener 110 into the top surface of the lower enclosure flange 116. Alternatively, the distance 170 can be decreased by rotation of the threaded fastener 110 in a second direction, retreating the threaded fastener 110 back through the tapped hole 124. In some cases, the threaded fastener 110 can be designed to withstand the gravitational force of the center post 112, when the threaded fastener 110 separates the lower enclosure flange 116 from the lower center post flange 122. In some embodiments, the threaded fastener 110 can be defined as a jack bolt. Thus, in some cases, the threaded fastener 110 can operate as a jack bolt to lift the center post 112 thereby separating the flanges 122, 116.

Although the arrangement as shown in FIG. 2A is configured for use at a lower end of a center post, other configurations are possible. For example, some embodiments can additionally (or alternatively) include a similar arrangement at the top end of a center post, including as further described below.

FIGS. 3-9 show an installation process for installing a center post 112. Specifically, FIG. 3 shows a front side 111 of the modified center post 112 during the beginning of the installation process. FIG. 3 also shows an upper installation system 108 as applied to the upper enclosure flange 118 and the upper center post flange 120. The upper center post flange 120 of the modified center post 112 also includes a centrally located tapped hole 124. Although implied due to the same numbering, the upper installation system 108 as applied to the upper flanges 118, 120, functions identically to the previously described lower installation system 109 as applied to the lower flanges 116, 122. In some cases, similar configuration of separate installation systems for use at different (e.g., upper and lower) parts of a center post can lead to improved efficiency of manufacturing and ease of use. In some cases, however, different systems can be used, for example, for upper and lower installations.

As shown in FIG. 3, the installation system 108 includes a number of fastening assemblies 138, 140, 142, 144, each including a threaded hole through the upper enclosure flange 118 (e.g., similar to the threaded holes through flange 116 in FIG. 2), a corresponding hole through the upper center post flange 120, and a fastener to fasten the upper enclosure flange 118 to the upper center post flange 120 at the fastening assembly. Each fastener of the fastening assemblies 138, 140, 142, 144 corresponds with a cut out or hole of the gasket 114. For example, the fastener of the fastening assembly 138 corresponds with the circular hole 132, the fastener of the fastening assembly 140 corresponds with the u-shaped cutout 128, the fastener of the fastening assembly 142 corresponds with the u-shaped cutout 130, and the fastener of the fastening assembly 144 corresponds with the circular hole 134. Additionally, the central u-shaped cutout 128 corresponds with the threaded fastener 110.

As shown in the illustrated embodiment of FIG. 3, the upper center post flange 120 of the modified center post 112 is brought into alignment with the upper enclosure flange 118. Then, the two centrally located fastening assemblies 140, 142 are installed. Specifically, the fastening assemblies 138, 140, 142, 144, include corresponding circular holes 146, 148, 150, 152, corresponding threaded circular holes 154, 156, 158, 160, and corresponding threaded fasteners 162, 164, 166, 168. The location of the circular holes and the circular threaded holes depends on whether the fastening assemblies correspond to the upper flanges 118, 120, or the lower flanges 116, 122. For example, if the fastening assemblies 138, 140, 142, 144 relate to the installation system 108 for the upper flanges 118, 120, then the circular holes 146, 148, 150, 152 are created through the upper center post flange 120 and the threaded circular holes 154, 156, 158, 160 are created through the upper enclosure flange 118. Alternatively, if the fastening assemblies 138, 140, 142, 144 relate to the installation system 108 for the lower flanges 116, 122, the circular holes 146, 148, 150, 152 are created through the lower center post flange 122, and the threaded circular holes 154, 156, 158, 160 are created through the lower enclosure flange 116. As such, while the installation systems 108, 109 are largely the same, and have similar components, the installation system 108 corresponds to the upper flanges, while the installation system 109 corresponds to the lower flanges.

Figure 6:
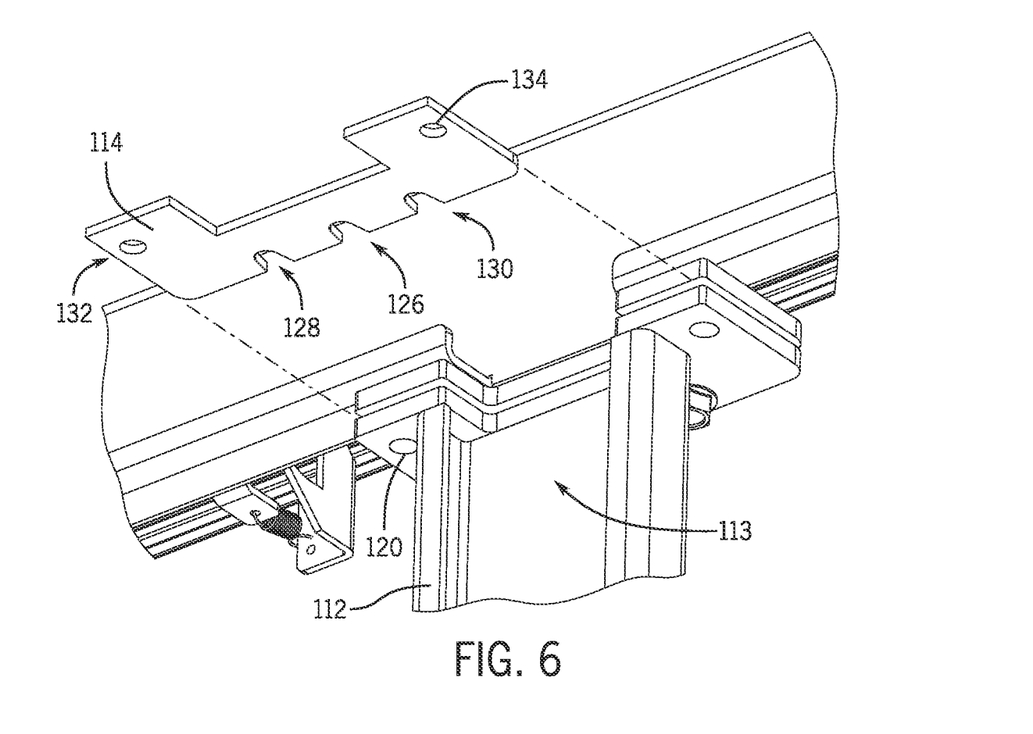
FIG. 6 is another isometric view of the upper installation system of FIG. 3, with a threaded fastener installed that separates the upper center post flange from the upper enclosure flange, during installation of the gasket of FIG. 2B between the separated upper center post flange and the upper enclosure flange.

In the illustrated embodiment of FIG. 3, the centrally located fastening assemblies 140, 142 are installed by inserting the threaded fastener 164 through the circular hole 148 of the upper center post flange 120 and threadingly engaging the threaded circular hole 156. Similarly, the threaded fastener 166 is inserted through the circular hole 150 of the upper center post flange 120 and threadingly engages the threaded circular hole 158. Then, the threaded fasteners 164, 166 are rotated in a first direction to fasten the upper center post flange 120 to the upper enclosure flange 118. However, the threaded fasteners 164, 166 are only rotated by hand (e.g., finger-tight without the use of tools, or other mechanical advantage components to tighten the fastener), which allows for a small gap to exist between the surface of the upper center post flange 120 and the upper enclosure flange 118. In some configurations, the gasket 114 can be installed within this small gap, only after the fastening assemblies 140, 142 have been installed. As shown in FIG. 6, the gasket 114 is inserted from a back side 113 of the modified center post 112, such that the respective fasteners 164, 166 are received within the u-shaped cutouts 128, 130.

Figure 4:
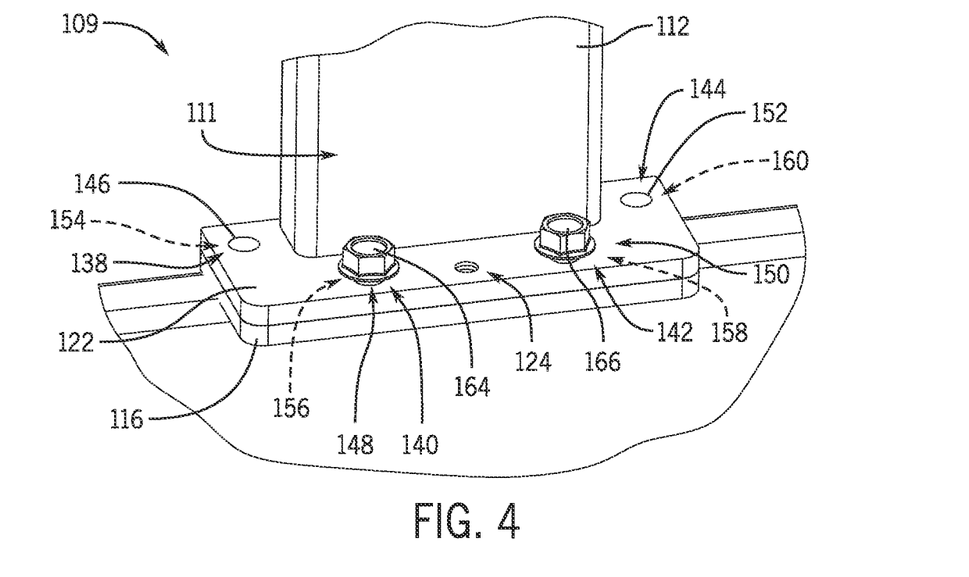
FIG. 4 is a top isometric view of the lower installation system of FIG. 2A for use with a lower center post flange and a lower enclosure flange.

FIG. 4 shows the front side 111 of the modified center post 112 with the lower installation system 109. The lower center post flange 122 of the modified center post 112 is brought into alignment with the lower enclosure flange 116. Then, the two centrally located fastening assemblies 140, 142 are also installed. As discussed above, with regard to the upper installation system 108, the threaded fasteners 164, 166 of the respective fastening assemblies 140, 142 are rotated and fastened by hand (e.g., without the use of tools, or other mechanical advantage components). Due to the mass of the center post 112, the surface of the lower center post flange 122 may tend to contact the surface of the lower enclosure flange 116. Additionally, due to the fasteners 164, 166 being fastened only finger-tight there should be a tolerance between the surface of the lower center post flange 122 and the surface of the lower enclosure flange 116 (e.g., if the modified center post 112 was temporarily lifted upwards a gap would exist).

Figure 5:
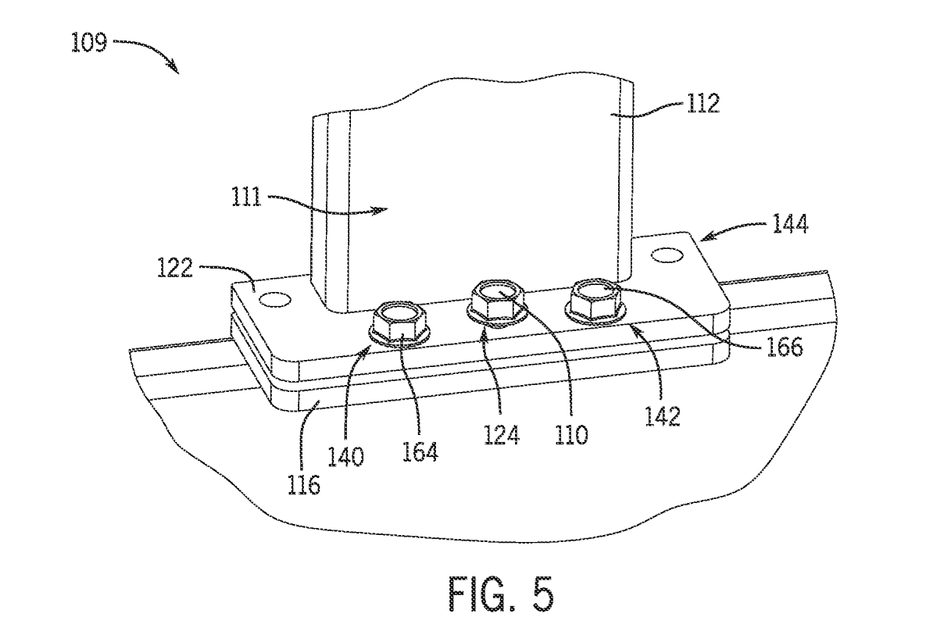
FIG. 5 is another top isometric view of the lower installation system of FIG. 4, with a threaded fastener installed and separating the lower center post flange from the lower enclosure flange.

In the illustrated embodiment, once the upper flanges 118, 120 and the lower flanges 116, 122 have been partially fastened together (e.g., with the respective fastening assemblies 140, 142), the lower threaded fastener 110 can be installed. As shown in FIG. 5, the threaded fastener 110 has threadingly engaged the corresponding lower tapped hole 124. When the threaded fastener 110 is rotated in a first direction, the threaded fastener further advances through the lower tapped hole 124 until the end surface of the threaded fastener 110 contacts the surface of the lower enclosure flange 116. When this happens, the threaded fastener 110 is further rotated in the first direction, such that the surface of the lower center post flange 122 begins to move away from the surface of the lower enclosure flange 116. The threaded fastener 110 can be rotated in the first direction until the desired clearance (or separation) between the lower center post flange 122 and the lower enclosure flange 116 is reached. However, in some cases, further rotation of the threaded fastener 110 may be impeded by the fastening of the fastening assemblies 142, 144. For example, as the threaded fastener 110 further rotates and the lower center post flange 122 lifts away from the lower enclosure flange 116, further lifting away of the lower center post flange 122 will be restricted by the fastening assemblies 140, 142. As needed, the fastening assemblies 140, 142 can be further loosened, to allow for a larger clearance.

In some embodiments, dimensions of the threaded fastener 110 can be manipulated to accommodate the forces imposed by the mass of the modified center post 112 onto the threaded fastener 110. For example, when the threaded fastener 110 is used as a jack to lift and separate the surface of the lower center post flange 122 form the surface of the lower enclosure flange 116, the threaded fastener 110 must support the modified center post 112, and thus must sustain these forces. Thus, the surface area of the top of the threaded fastener 110, the length of the threaded fastener 110, the threads of the threaded fastener 110, etc., can be configured (e.g., sized) depending on the shape, mass, etc., of the modified center post 112.

In some embodiments, the central location the threaded fastener 110 prevents rotation of the modified center post 112 prior to the insertion of the gasket 114 (e.g., by the alignment between the center of mass of the modified center post 112 and the contact point of the threaded fastener 110). However, with different shapes of a center post 112, the center of mass of the center post 112 may not be centrally located. Thus, in some alternative embodiments, the threaded fastener 110 and the corresponding tapped hole 124 can align with the center of mass of a center post at a non-central location. In some embodiments, the threaded fastener 110 can have a 5/16 inch diameter.

In some embodiments, the tapped hole 124 can also have a 5/16 inch diameter. In some embodiments, such as illustrated, the tapped hole 124 can be positioned substantially (e.g., deviating by less than 20 percent) equidistant relative to the holes 148, 150 of the lower center post flange 122, as may also assist with appropriate balancing of the center post 112 during installation.

In some embodiments, once the lower threaded fastener 110 has been installed, and the desired separation between the lower flanges 116, 122 has been achieved, each of the gaskets 114 can be installed. Alternatively, however, the upper threaded fastener 110 can be installed within the upper tapped hole 124, prior to the installation of the gaskets 114 (e.g., by a similar mechanism as the lower threaded fastener 110). The installation of the upper threaded fastener 110, can be advantageous, for example, as the contact between the top of the upper threaded fastener 110 and the surface of the upper enclosure flange 118 can allow for better stability between the upper flanges 118, 120. This can make installation of the upper gasket 114 easier. In some cases, however, after the lower threaded fastener 110 has been installed and the lower flanges 116, 122 have been separated, the lower gasket 114 can be installed.

Figure 7:
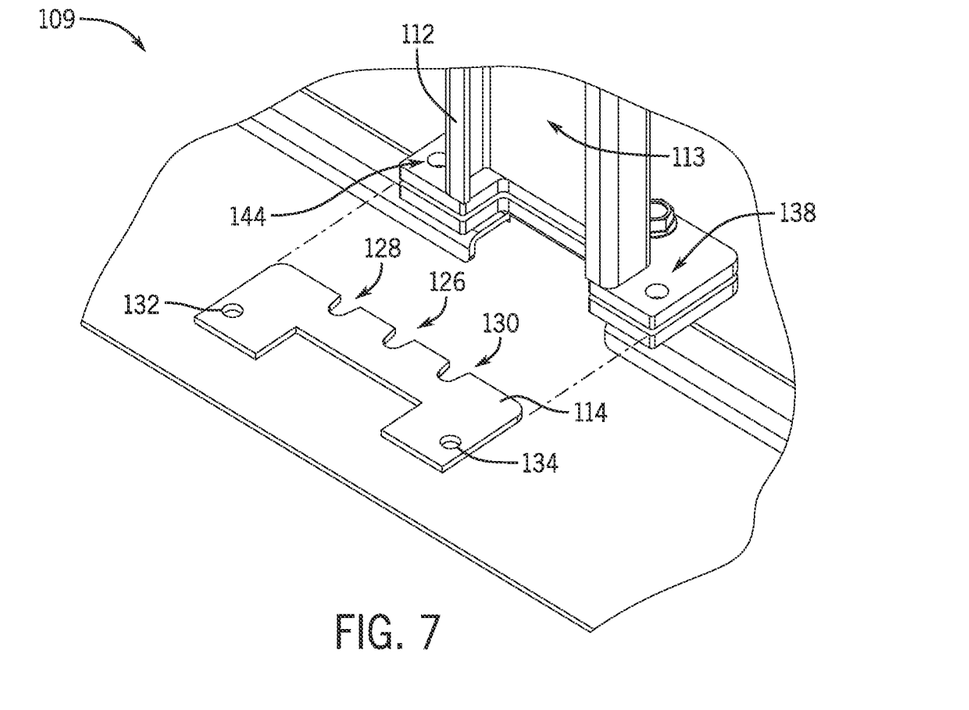
FIG. 7 is another isometric view of the lower installation system of FIG. 5, during installation of the gasket of FIG. 2B between the separated lower center post flange and the lower enclosure flange.

FIGS. 6 and 7 show the installation of the gaskets 114 between the enclosure 100 and the center post 112. Specifically, FIG. 6 shows the installation of the upper gasket 114 between the upper flanges 118, 120. As illustrated, the upper gasket 114 is inserted from the rear side 113 of the modified center post 112, and slid within the gap between the surface of the upper center post flange 120 and the surface of the upper enclosure flange 118. The upper gasket 114 is oriented such that the u-shaped cutouts 126, 128, 130 are inserted first towards the rear side 113 of the center post. The upper gasket 114 is maneuvered until the u-shaped channel 126 is received around the upper threaded fastener 110, the u-shaped channel 128 is received around the threaded fastener 164, and the u-shaped channel 130 is received around the threaded fastener 166. Due to the threaded fastener(s) 110 maintaining a separation at the upper flanges 118, 120 and the lower flanges 116, 122, the installer has ample time to adjust the orientation of the gaskets 114. When the u-shaped cutouts 126, 128, 130 of the upper gasket 114 are properly installed around the respective components, the circular holes 132, 134 align with the holes of the respective fastening assemblies 138, 144.

FIG. 7 shows the installation of the lower gasket 114 between the lower flanges 116, 122. The installation of the lower gasket 114 is similar or identical to the installation of the upper gasket 114 between the upper flanges 118, 120. Specifically, the lower gasket 114 is inserted from the rear side 113 of the modified center post 112. The lower gasket 114 is also oriented, such that the u-shaped cutouts 126, 128, 130 are inserted first towards the rear side 113 of the modified center post 112, with the open ends of the cutouts 126, 128, 130 aligned with (or at least oriented towards) the fastener 110 and the fasteners 164, 166 as appropriate. Similarly to the discussion above, the lower gasket 114 is maneuvered until the u-shaped channel 126 is received around the upper threaded fastener 110, the u-shaped channel 128 is received around the threaded fastener 164, and the u-shaped channel 130 is received around the threaded fastener 166.

Figure 8:
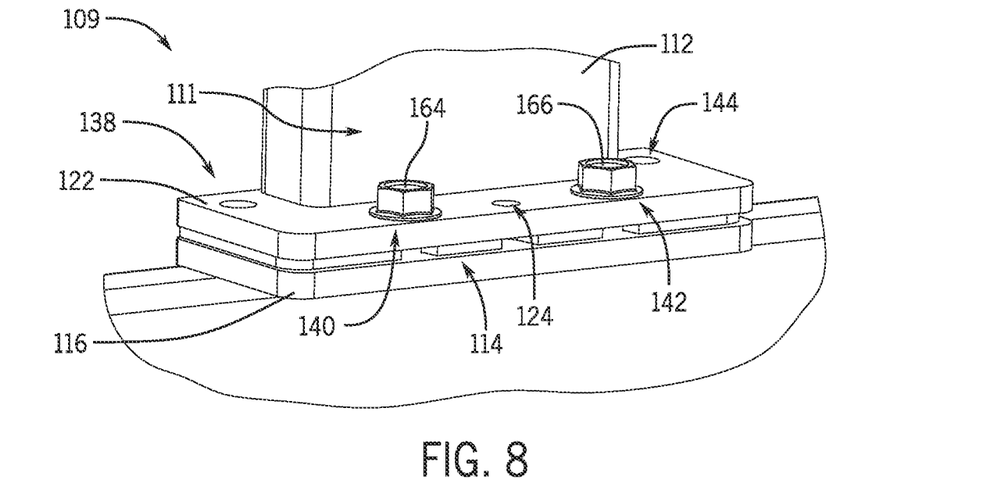
FIG. 8 is another isometric view of the lower installation system of FIG. 7 with the gasket of FIG. 2B installed, and with the threaded fastener removed.

Once the upper and lower gaskets 114 have been properly placed, the installation of the modified center post 112 can continue. First, the lower threaded fastener 110 is rotated in a second direction to retreat the upper fastener 110 back through the lower tapped hole 124. The lower threaded fastener 110 is also rotated until the lower threaded fastener 110 is removed from the lower tapped hole 124 (or at least moved clear of contact with the lower flange 116). Upon retreating the lower threaded fastener 110 back through the lower tapped hole 124 the lower flanges 116, 122 are brought closer together to compress the lower gasket 114. FIG. 8 shows the lower flanges 116, 122 after the lower gasket 114 has been installed and the lower threaded fastener 110 has been removed. If the upper fastener 110 has previously been installed, the upper fastener 110 can be similarly removed from or at least loosened in the upper tapped hole 124.

Figure 9:
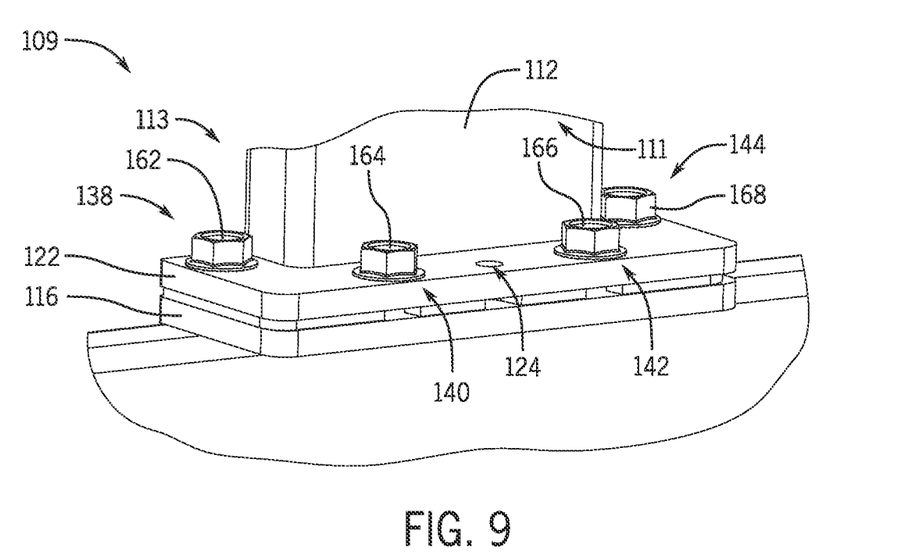
FIG. 9 is another isometric view of the lower installation system of FIG. 8 with the gasket of FIG. 2B installed, the threaded fastener removed, and the remaining fastening assemblies installed.

FIG. 9 shows a fully installed configuration of the lower flanges 116, 122. Once the lower threaded fastener 110 has been removed (or appropriately loosened), the fastening assemblies 138, 144 are fully installed. Specifically, the threaded fasteners 162, 168 fasten together the lower flanges 116, 122. In some cases, the threaded fasteners 162, 168 are rotated by hand (e.g., finger-tight without the use of tools, or other mechanical advantage components). Similarly, once the upper threaded fastener 110 has been removed (e.g., if used during the installation), the upper fastening assemblies 138, 144 can also be installed "finger tight."

In some embodiments, prior to the removal of the lower and the upper threaded fastener 110 (e.g., if the upper threaded fastener 110 was used during installation) the fastening assemblies 138, 144 can be installed finger-tight for both the upper flanges 118, 120 and the lower flanges 116, 122. In this configuration, with the threaded fastener(s) 110 still installed, the fastening assemblies 138, 144 can be installed more easily, with the threaded fastener(s) 110 providing support. Once the fastening assemblies 138, 144 have been installed (e.g., finger-tight) for both the upper flanges 118, 120 and the lower flanges 116, 122, the threaded fastener(s) 110 can be removed.

As needed, once the fastening assemblies 138, 144 have been installed finger-tight for both the upper flanges 118, 120, and the lower flanges 116, 122, all of the fastening assemblies 138, 140, 142, 144 can be further tightened, beyond finger-tight, for both the upper flanges 118, 120, as well as the lower flanges 116, 122. The further tightening of the fastening assemblies 138, 140, 142, 144, further compresses the gasket 114 between the respective flanges.

In some embodiments, and as discussed above, the upper and lower installation systems 108 can help with the removal of the modified center post 112. For example, the process described above can be completed in the reverse order to remove the modified center post 112. As a specific example, the fastening assemblies 138, 140, 142, 144 can be unfastened until each is finger tight, for both the upper and lower installation systems 108. Then, the lower threaded fastener 110 can be advanced to lift the lower center post flange 122 away from the lower enclosure flange 116. Similarly, if desired, the upper threaded fastener 110 can be advanced to help with the separation of the upper flanges 118, 120. Once the threaded fastener(s) 110 are appropriately advanced, the upper and lower gaskets 114 can be removed. Then, the threaded fastener(s) 110 can be loosened (e.g., removed), and the fastening assemblies 138, 140, 142, 144 can be removed. The modified center post 112 can then be easily removed.

Although the description above mentioned fastening the fastening assemblies 138, 140, 142, 144 only until finger tight, in alternative embodiments, the fastening assemblies can be fastened less than finger-tight. In this case, with the fastening assemblies fastened less than finger-tight, the respective flanges can be separated at a greater distance. This can, for example, allow for the easy installation of a gasket with a greater thickness.

Figure 10:
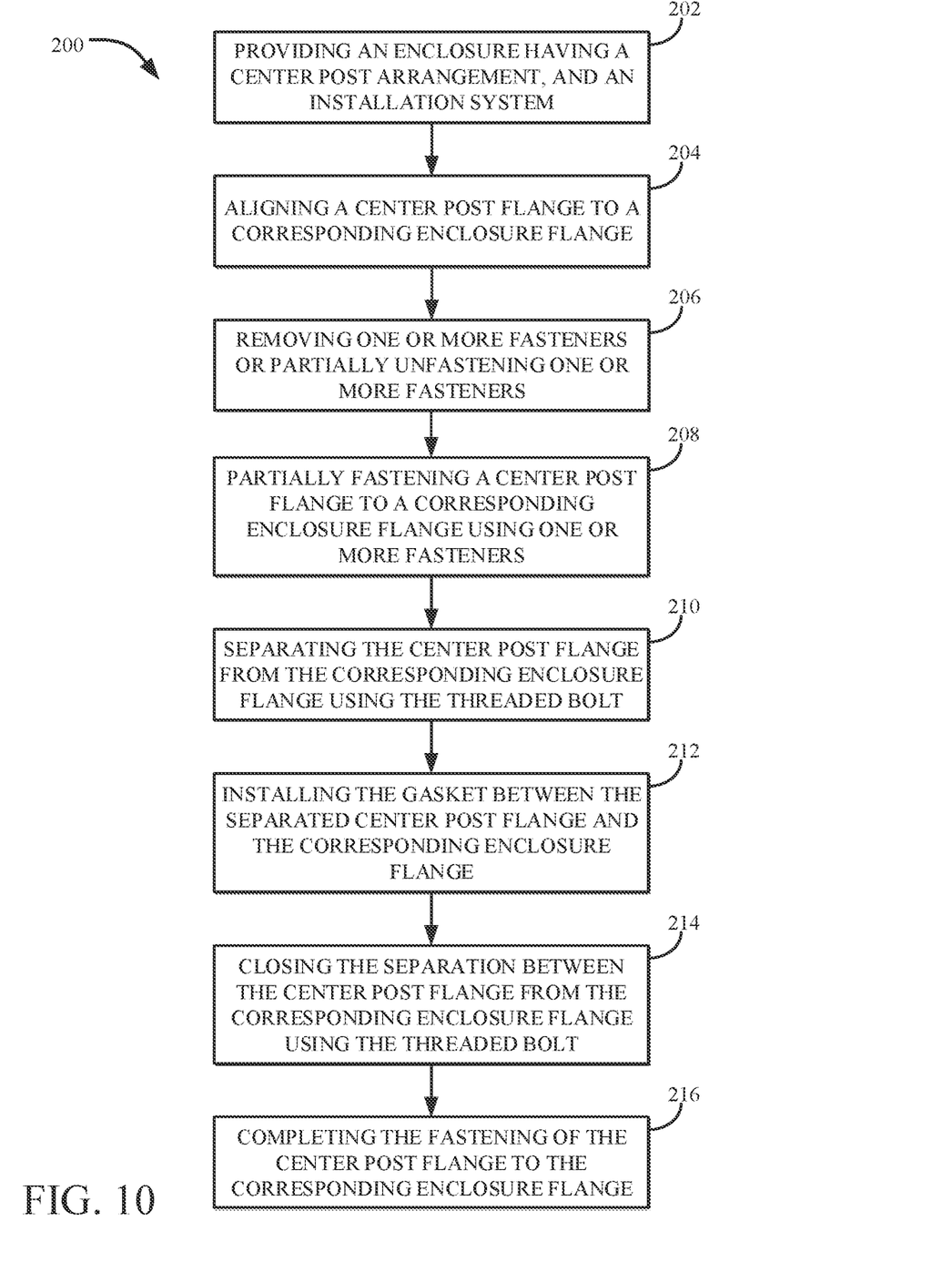
FIG. 10 is a flowchart of a process for configuring a center post of an enclosure.

FIG. 10 shows a flowchart of a process 200 for configuring a center post of an enclosure. In some embodiments, configuring the center post can include unfastening the center post from the enclosure, lifting (or lowering) the center post, and reconfiguring (or replacing) one or more gaskets. In other embodiments, configuring the center post can include lowering (or lifting) the center post, compressing or sealing the gasket, and fastening the center post to the enclosure. In some configurations, configuring the center post, can include various combinations of the possibilities described above (or others). In some cases, the process 200 can be helpful for easily replacing gaskets for enclosures (e.g., to provide a greater seal, or to replace potentially worn or damaged gaskets). For example, if the gasket is worn and most of the components of the enclosure (e.g., the enclosure 100) are relatively free of wear or damage and thus do not need to be replaced, the process 200 can be easily implemented to remove the potentially damaged gasket. As another example, if the enclosure is to be moved to a location that requires higher sealing standards, the process 200 can be easily implemented to replace a first gasket (e.g., gasket 114) having a first thickness with another gasket (e.g., another gasket 114) having a second thickness that is greater than the first, and which can provide a higher degree of sealing than the first gasket.

At 202, the process 200 can include providing an enclosure (e.g., enclosure 100) having a center post arrangement (e.g., the modified center post 112 and modified accordingly with the appropriate installation system), one or more gaskets (e.g., gaskets 114) and one or more installation systems (e.g., one or both of installation systems 108, 109). In some configurations, the enclosure, the center post arrangement, and the installations system(s) (as appropriate) can be in an entirely installed configuration, a partially installed configuration, or a completely uninstalled configuration. For example, in the entirely installed configuration, for a given installation system, one flange of the center post can be fastened to a corresponding flange of the enclosure (e.g., with all of the fasteners of each fastening assembly) with a gasket sandwiched therebetween (see, e.g., FIG. 9). Thus, in some cases, with two installation systems, each flange of the center post is fastened to a corresponding flange with a gasket sandwiched therebetween. As another example, in the partially installed configuration one or both of the installation systems can have only some of the fasteners fully (or partially) fastened to couple a particular center post flange to the corresponding enclosure flange (see, e.g., FIGS. 3, 4). As yet another example, in the uninstalled configuration, all of the components including the enclosure, the center post, the gaskets, the fasteners, and the threaded fasteners (e.g., the threaded fastener 110 or the jack fastener) can be set aside and not coupled to the enclosure.

At 204, the process 200 can include aligning a center post flange to a corresponding enclosure flange. In some embodiments, aligning a center post flange (e.g., the lower center post flange 122) with a corresponding enclosure flange (e.g., the lower enclosure flange 116) includes ensuring that the perimeter of the center post flange aligns (or coincides) with the perimeter of the perimeter of the corresponding enclosure flange, which can include ensuring that the center post flange is not offset relative to the enclosure flange. In some embodiments, aligning a center post flange can include aligning one or more holes of the center post flange with one or more corresponding holes of the corresponding enclosure flange. For example, this can include one or more of: aligning a first hole of the center post flange with a second (threaded) hole of the corresponding center post flange, aligning a third hole of the center post flange with a fourth (threaded) hole of the corresponding center post flange, aligning a fifth hole of the center post flange with a sixth (threaded) hole of the corresponding center post flange, and aligning a seventh hole of the center post flange with a eighth (threaded) hole of the corresponding center post flange. In some embodiments, this alignment can be completed for both one set of the lower center post and lower enclosure flanges, and the other set of upper center post and upper enclosure flanges.

At 206, the process 200 can include removing one or more fasteners, or partially unfastening one or more fasteners that are fastened to couple together the center post flange with the corresponding center post flange. In some embodiments, as described above, the enclosure can arrive at a location preassembled (e.g., either fully or partially preassembled) such that the installation system (e.g., the installation systems 108, 109) is partially or fully preassembled (see, e.g., FIG. 9). Thus, in some cases, to reposition, replace, or substitute the previously installed gasket more easily, some of the fasteners of the installation system should be removed, or partially unfastened. For example, in some cases, with the installation system fully assembled two fasteners positioned on opposing sides of the center post flange (e.g., fasteners 162,168 each positioned farthest away from the hole for the jack fastener) can be unfastened (e.g., by rotation in a particular direction), or in some cases, can be partially unfastened (i.e., loosened). Similarly, the two centrally located fasteners that are located closest to and on opposing sides of the threaded hole that is configured to receive the jack fastener, can be partially unfastened by rotation in the particular direction. This way, the center post can upwardly (or downwardly) move (e.g., translate) until the center post flange contacts the loosened fasteners, for subsequent and relatively easy placement of the gasket.

In some embodiments, unfastening the one or more fasteners can include loosening two or more fasteners substantially (e.g., deviating by less than 20%) the same amount. This configuration can increase the stability of the center post flange relative to the corresponding flange at least because, as described below, when the threaded fastener (e.g., jack fastener) separates the two flanges, rocking (or rotation) of the center post flange may be minimized because the distances between the respective fasteners and the flange(s) are substantially the same. In some embodiments, this loosening (or unfastening) can be completed for both sets of the lower center post and enclosure flanges and the upper center post and enclosure flanges.

At 208, the process 200 can include partially fastening a center post flange to an enclosure flange using one or more fasteners. In some embodiments, such as when the enclosure arrives partially assembled or completely unassembled, partially fastening a center post flange to the corresponding enclosure flange can help to stabilize the respective flanges for subsequent placement of the gasket. In some embodiments, two fasteners positioned closest to and on opposing sides of the center post flange (e.g., fasteners 164,166) can be partially fastened (e.g., by rotation in direction opposing the particular direction). In some cases, the remaining two fasteners situated on opposing sides of the center post flange (e.g., fasteners 162, 168) can also be partially fastened. In some embodiments, fastening (or tightening) the one or more fasteners can include loosening two or more fasteners by substantially the same amount (e.g., deviating by less than 20%). This configuration can increase the stability of the center post flange relative to the corresponding flange at least because, as described below, when the threaded fastener (e.g., jack fastener) separates the two flanges, rocking (or rotation) of the center post flange may be minimized because the distances between the respective fasteners and the flange(s) are substantially the same. In some embodiments, this fastening (or tightening) can be completed for both sets of the lower center post and enclosure flanges, and the upper center post and enclosure flanges.

At 210, the process 200 can include separating the center post flange from the corresponding enclosure flange using the threaded fastener (e.g., the threaded fastener 110, or stated another way the jack fastener). In some embodiments, separating the center post flange from the corresponding enclosure flange can include threadingly engaging the threaded fastener with the threaded hole (e.g., the tapped hole 124), and rotating the threaded fastener to advance the threaded fastener through the hole until the end surface of the threaded fastener contacts the surface of the enclosure flange. The threaded fastener can then be further rotated to further advance the threaded fastener through the hole thereby separating the center post flange from the corresponding enclosure flange. In some cases, the threaded fastener can be further rotated until the upper surface of the enclosure flange contacts one or more of the fasteners (e.g., fasteners 164, 166) that were partially fastened. In some embodiments, this separating of the flanges using a respective threaded fastener can be completed for both one set of the lower center post and lower enclosure flanges, and the other set of upper center post and upper enclosure flanges. For example, one threaded fastener can be advanced to separate (e.g., lift) the lower center post flange from the lower enclosure flange, and another threaded fastener can be advanced to separate (e.g., lower) the upper center post flange from the upper enclosure flange.

At 212, the process 200 can include installing the gasket between the separated center post flange and the corresponding enclosure flange. In some cases, the previously installed gasket (e.g., the gasket 114) has been damaged, worn, or otherwise needs to be replaced (e.g., substituted for a different sized gasket, such as one having a greater thickness), and thus process 200 can include removing a gasket from the (e.g., one that has been previously installed) separated center post flange and the corresponding enclosure flange. In some cases, the gasket has simply shifted from a desired position, and thus the previously installed gasket can be removed, and subsequently installed, or reoriented (e.g., according to the methods of process 200). In other cases, such as the completely uninstalled configuration, no gasket has been previously installed, and thus no gasket needs to be removed prior to installment of the gasket.

In some embodiments, the process 200 can include orienting the gasket properly, which can include positioning the front of the gasket (e.g., the gasket 114), which can include one or more of the cutouts (e.g., cutouts 126, 128, 130) to face a rear side of the center post (e.g., the back side 113 of the modified center post 112). In some cases, this positioning can include positioning the gasket, such that a rectangular cutout (e.g., rectangular cutout 136) faces away from the rear side of the center post. In some embodiments, such as when the gasket is oriented (or positioned) properly, the process 200 can include inserting the gasket between the separated center post flange and the corresponding enclosure flange, such that the front side of the gasket is inserted first, followed by the rear side of the gasket. In some cases, inserting the gasket can include the inserting of one or more of the fasteners into the respective cutouts. In some configurations, the gasket can be inserted and advanced until one or more of the fasters contact a (rear) edge of the corresponding cutout, or more particularly the concave region of the cutout. In some configurations, this can be particularly advantageous in that by contacting three of the fasteners with a respective cutout, the positioning and orientation of the gasket can be determined quickly and confirmed tactilely. For example, if only two of the fasteners contacted two of the respective cutouts (with the gasket having three cutouts), then the orientation of the gasket must be off (e.g., the gasket is rotated), which can be determined quickly by the installer. In some embodiments, this installing of a gasket can be completed for both one set of the lower center post and lower enclosure flanges, and the other set of upper center post and upper enclosure flanges.

At 214, the process 200 can include closing the separation between the center post flange from the corresponding enclosure flange using the threaded fastener. In some embodiments, the threaded fastener, used to separate the flanges, can be rotated to retreat the threaded fastener back through the hole. In some cases, such as with the lower installation system and due to gravity, the retreating of the threaded fastener back through the hole closes the separation by lowering the center post. In other cases, such as with the upper installation system, the retreating of the threaded fastener back through the hole may not automatically close the separation (e.g., due to the partially fastened fasteners). In some embodiments, the threaded fastener (or both threaded fasteners) can be removed from engagement with the center post flange, while in other cases, such as described below, the threaded fasteners can be strategically removed to help with ease of installation.

At 216, the process 200 can include completing the fastening of the center post flange to the corresponding enclosure flange. In some embodiments, the process 200 can include fastening the one or more of the fasteners to the corresponding holes (e.g., through a respective hole in the enclosure flange and threadingly engaging a hole in the enclosure flange). Additionally, in some cases, the process 200 can include further fastening the partially fastened fasteners (e.g., fasteners 164, 166).

In some configurations, the specific order of removal of specific threaded fasteners (e.g., the jack fasteners) and completion of the fastening of the flanges can be advantageous. For example, in one configuration, the upper threaded fastener can be removed, and the upper center post flange can be fastened to the upper enclosure flange when the lower threaded fastener has not been removed or retreated (e.g., the threaded fastener at 210 of process 200). In this case, the lower threaded fastener helps to maintain the lifted position of the center post, which can help with fastening of the upper center post flange to the upper enclosure flange. Then, the lower threaded fastener can be retreated and removed to lower the center post, and after the lower center post flange can be fastened to the lower enclosure flange. As such, the process 200 can include fastening the flanges for both one set of the lower center post and lower enclosure flanges, and the other set of upper center post and upper enclosure flanges.

Thus, embodiments of the inventions can provide an improved installation system to install or remove a center post. More specifically, the installation systems and methods, according to some embodiments of the present disclosure, provide for easy installation and removal of gaskets sandwiched between a flange of the center post and a flange of the enclosure body.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A method, comprising:
arranging a center post for installation in an enclosure having a first enclosure flange, including aligning a first center post flange of the center post with the first enclosure flange;
contacting the first enclosure flange with an end of a threaded fastener that is threadedly engaged with the first center post flange;
with the end of the threaded fastener contacting the first enclosure flange, expanding a gap between the first enclosure flange and the first center post flange via rotation of the threaded fastener, in a first direction;
after expanding the gap, inserting a gasket between the first enclosure flange and the first center post flange; and
after inserting the gasket, reducing the gap between the first enclosure flange and the first center post flange via rotation of the threaded fastener in a second direction, such that the gasket is compressed between the first enclosure flange and the first center post flange.

2. The method of claim 1, wherein the gasket defines a gasket hole extending therethrough.

3. The method of claim 2, wherein the gasket hole is a cutout that is centrally located on the gasket.

4. The method of claim 3, wherein the cutout defines a slot extending from an edge of the gasket to an end portion of the slot.

5. The method of claim 4, wherein inserting the gasket within the gap includes orienting the gasket between the first center post flange and the first enclosure flange such that the threaded fastener is received into the slot.

6. The method of claim 5, wherein inserting the gasket includes moving the gasket to seat the threaded fastener in the end portion of the slot.

7. The method of claim 6, wherein the end portion is a concave end portion.

8. The method of claim 1, wherein aligning the first enclosure flange and the first center post flange further comprises:

orienting the first center post flange and the first enclosure flange such that a perimeter of the first center post flange and a perimeter of the first enclosure flange coincide, to align a plurality of holes of the center post flange with a plurality of holes of the enclosure flange; and fastening the first center post flange to the first enclosure flange with fasteners arranged through the pluralities of aligned holes of the first center post flange and the first enclosure flange.

9. The method of claim 8, wherein threaded fastener is received through the first center post flange between a first set of the aligned holes and a second set of the aligned holes.

10. The method of claim 1, further comprising:
before expanding the gap, partially fastening the center post flange to the enclosure flange with a plurality of threaded fasteners.

11. A method comprising:
aligning an enclosure flange of an enclosure and a center post flange of a center post;
rotating, in a first direction, a threaded fastener engaged with a threaded hole of the center post flange, until an end surface of the threaded fastener bears against a surface of the enclosure flange to move the enclosure flange away from the center post flange;
inserting a gasket between the enclosure flange and the center post flange; and
rotating the threaded fastener, in a second direction, to sandwich the gasket between the enclosure flange and the center post flange.

12. The method of claim 11, wherein inserting the gasket between the enclosure flange and the center post flange includes inserting the threaded fastener though a gasket hole of the gasket.

13. The method of claim 12, further comprising:
before inserting the gasket between the enclosure flange and the center post flange, partially fastening the center post flange to the enclosure flange with one or more fasteners.

14. The method of claim 13, wherein inserting the gasket includes inserting the one or more fasteners into one or more cutouts in the gasket.

15. The method of claim 14, wherein center post flange is partially fastened to the enclosure flange with a first fastener and a second fastener, before the gasket is inserted between the enclosure flange and the center post flange; and
wherein inserting the gasket between the enclosure flange and the center post flange includes inserting the first fastener into a first cut out of the one or more cutouts and the second fastener into a second cut out of the one or more cutouts.

16. The method of claim 15, wherein the gasket hole is a central cutout located on the gasket between the first cut out and the second cut out.

17. The method of claim 15, wherein each of the first cutout, the second cutout, and the gasket hole defines a slot extending from an edge of the gasket.

18. The method of claim 15, further comprising:
after partially fastening the center post flange to the enclosure flange and inserting the gasket between the enclosure flange and the center post flange, fully fastening the center post flange to the enclosure flange with the first and second fasteners.

19. The method of claim 11, wherein the enclosure flange and the center post flange are aligned such that a perimeter of the center post flange and a perimeter of the enclosure flange coincide.

20. An enclosure, comprising:
an enclosure flange;
a center post including a center post flange located at a first end of the center post, wherein the center post flange includes a hole extending therethrough;
a center post gasket; and
a threaded fastener threadingly engaged with the hole;
wherein the threaded fastener rotates in a first direction to contact the enclosure flange; and
wherein continued rotation of the threaded fastener in the first direction, while the threaded fastener is in contact with the enclosure flange, expands a gap between the enclosure flange and the center post flange to insert or remove the center post gasket.

\* \* \* \* \*